Aug. 25, 1970     R. L. CARTMELL     3,525,939
HAND HELD INSTRUMENT HAVING A PAIR OF INDICATOR LAMPS FOR
INDICATING VOLTAGE LEVELS IN ELECTRICAL CIRCUITS
Filed Aug. 1, 1968
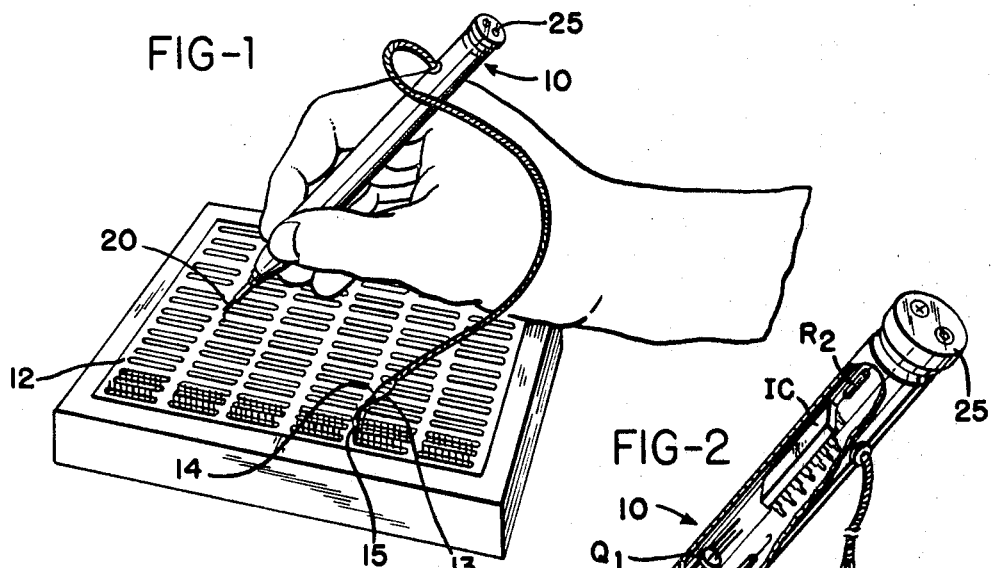
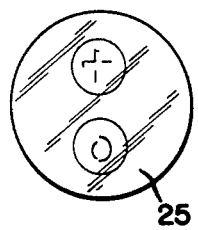
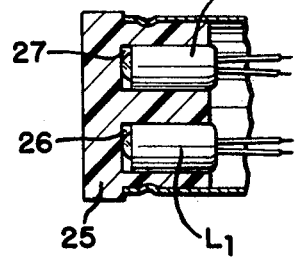
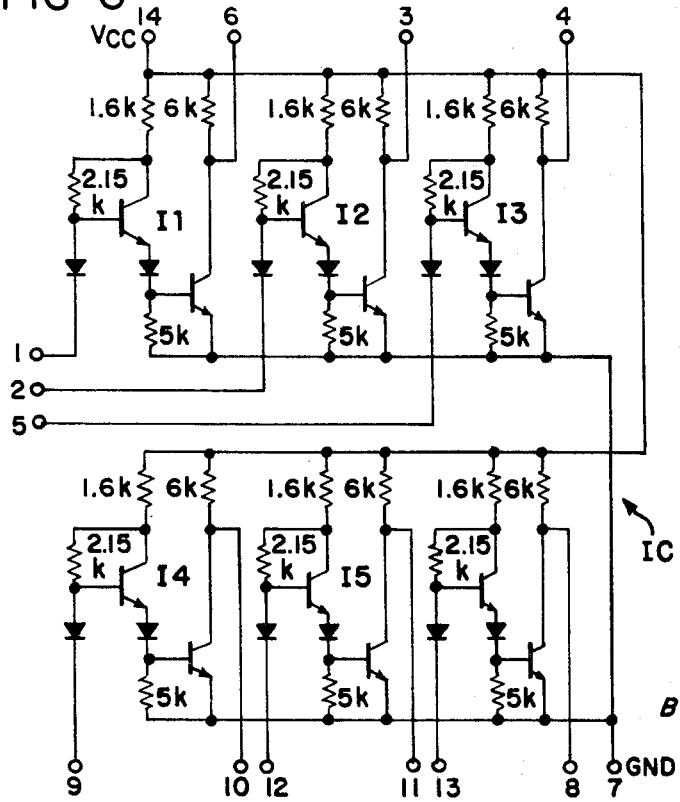
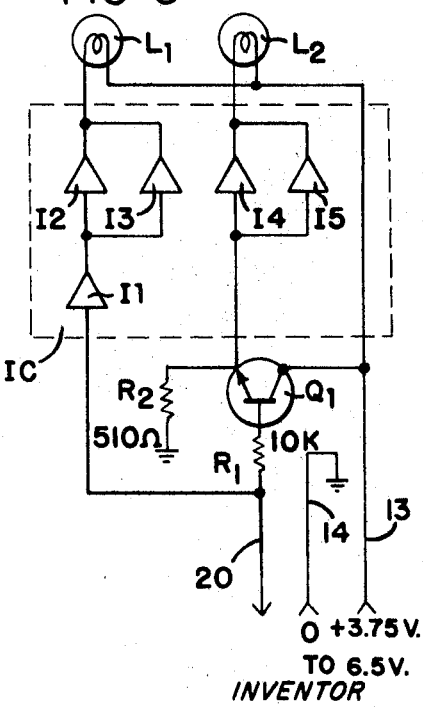
INVENTOR
ROBERT L. CARTMELL
BY Marechal, Biebel, French & Bugg
ATTORNEYS

United States Patent Office 3,525,939
Patented Aug. 25, 1970

3,525,939
HAND HELD INSTRUMENT HAVING A PAIR OF INDICATOR LAMPS FOR INDICATING VOLTAGE LEVELS IN ELECTRICAL CIRCUITS
Robert L. Cartmell, Xenia, Ohio, assignor to Kurz-Kasch, Inc., Dayton, Ohio, a corporation of Ohio
Filed Aug. 1, 1968, Ser. No. 749,503
Int. Cl. G01r 19/16
U.S. Cl. 324—133       8 Claims

ABSTRACT OF THE DISCLOSURE

A hand held instrument having an electrically conductive probe at one end and a display screen containing two lights at the other end is used to sense the logic condition of a component part in a high density packaged circuit. Three conditions may be indicated by two lights within the display screen. A first condition, where the input is at logic 1 (where the input voltage exceeds a first predetermined value), is indicated by the first light, and a second condition, where the input is a logic zero (where the input voltage is less than a second predetermined value), is indicated by the second light, and a third condition, where the input is floating or where the input voltage lies somewhere between the first and second predetermined voltages, is indicated by neither light being energized.

BACKGROUND OF THE INVENTION

In testing various integrated circuit logic systems, such as used in computers, it has been the practice to use a probe from an oscilloscope to determine if the input to a particular component is a logic "1" or a logic "0." However, this requires the technician to shift his eyes from the monitored component to the oscilloscope to make this determination, and if several parts must be checked, this may cause fatigue or error in making the measurements.

SUMMARY OF THE INVENTION

This invention relates to a hand held device for indicating the logic level at various terminals on a circuit board and includes a body having an electrically conductive probe at one end and a display screen at the other end which contains two lights to indicate whether the voltage at the end of the probe represents a logic 1 or a logic 0. In the preferred embodiment, power to the instrument is obtained from leads which connect to the circuit undergoing test, although the device could be self-powered by a battery, if desired. A circuit within the instrument determines whether the voltage on the probe is above a first predetermined magnitude, and if this is the case, a lamp indicating a logic 1, or true condition, is energized, or if the voltage on the probe is less than a second predetermined magnitude, then a lamp indicating a logic 0 is energized, and if the probe senses an infinite impedance, or if the voltage is between the first and second predetermined magnitudes, no lamp will be energized. If the circuit undergoing test is producing clock pulses, then the lamps will be energized alternately.

Since the components which comprise this instrument are all extremely small, the instrument can be hand held, thus placing the indicator lamps in close proximity to the test probe thereby allowing the operator to check the condition of the circuit quickly without requiring him to move his eyes back and forth from the probe to a remotely located indicating screen. Since the instrument uses teh same components as are used in most of the equipment which will be tested, then the input to this circuit is compatible with that equipment.

The instrument may also be used as a convenient and inexpensive monitor in those situations where a technician may wish to know the condition of a circuti undergoing test but which does not require the use of more expensive equipment, such as an oscilloscope, which may be needed for testing other components.

It is therefore an object of this invention to provide an improved instrument for indicating the logic condition of a circuit wherein indicator lights are formed as part of the instrument and are placed in close proximity to the sensing probe so that the operator does not have to look from one place to another in order to determine the status of the component; to provide an instrument wherein one of three conditions is shown visually by a pair of indicator lamps, a first lamp to indicate a logic 1, a second lamp to indicate a logic 0, and a third condition where both lamps are out to indicate a floating or open circuit; to provide an inexpensive and accurate instrument which may be used in place of an oscilloscope in monitoring the voltage level on components within a logic circuit; and to provide an instrument having a very high impedance to circuit exhibiting a logic 1 to prevent loading of that circuit and presenting a relatively low impedance to those circuits exhibiting a logic 0.

Other objects and advantages of the invention will be apparent from the following description, the accompanying drawings and the appended claims.

BRIEF DESCRIPTION OF THE DRAWINGS

FIG. 1 is a pictorial view showing the hand held instrument being used on a circuit board of the type to mount integrated circuits;

FIG. 2 is a pictorial view of the instrument with a portion of the case broken away to show the general location of the components within the instrument;

FIG. 3 is an enlarged end view of the display screen;

FIG. 4 is a cross sectional side view of the display screen;

FIG. 5 is an electrical schematic diagram of the instrument; and

FIG. 6 is an electrical schematic diagram of the integrated circuit which is used within the instrument.

DESCRIPTION OF THE PREFERRED EMBODIMENT

Reference is now made to FIG. 1 which shows the instrument 10 of this invention being used to test various terminals on a circuit board 12 which is especially adapted to mount integrated circuit packages. A typical circuit board 12 is 4 x 8 inches in size and is so constructed that sixty integrated circuit packages, each having fourteen contacts, can be installed thereon. The circuit board 12 includes in insulating board on which is mounted sockets which receive and hold the connectors extending from the integrated circuits. Pins, each having a generally square cross section, extend outwardly on the other side of the board from each of the sockets. Wire may be wrapped around these pins to interconnect the elements of the various integrated circuits.

The circuit board also includes a pair of electrically conductive plates, one on each side of the insulating board, and these plates have openings therein around each set of pins and sockets. One plate of the circuit board is connected to the positive terminal of the power source while the plate on the opposite side of the board is connected to the negative terminal of the same power source. Two additional pins for each set of integrated circuits are connected, usually by soldering, to these plates, and thus to the source of power. Accordingly, this source of power is readily available for use by the instrument 10, and in the preferred embodiment, a pair of wires 13 and 14 extend from the instrument and have terminals 15 at their ends which can be slipped over the pins connected to the power source.

As shown in FIG. 2, the instrument 10 includes an elongated, cylindrical body 19 which may be hand held, and an electrically conductive probe 20 at its forward end which may be placed in electrical contact with one of the pins on the board 12 to determine whether the voltage on that pin represents a logic 0 or a logic 1. The probe 20 is mounted to the body 19 by an insulating bushing 21. As insulating sleeve 22 surrounds all but the end of the probe 20 so that when the probe is placed in the circuit board to determine the logic level of a pin, it will not cause a short circuit to develop from one pin to another.

A display screen 25 is mounted in the opposite end of the body 16 and, as shown in FIGS. 3 and 4, the display screen of transparent plastic has formed therein two openings 26 and 27, each containing a lamp L1 and L2. Lamp L1 illuminates a "0" mark to indicate a logic 0 condition, and lamp L2 illuminates a "+" mark to indicate a logic 1 or true condition. In the preferred embodiment, the marks "+" and "0" are engraved in the plastic display screen 25. The close proximity of the display screen 25 to the probe 20 thus enables the operator to determine quickly the status of any one of the pins on the circuit board without having to move his eyes from the general area undergoing analysis. Colored dye or lacquer may be applied to the openings 26 and 27 to assist the operator in determining quickly the logic level of the circuit. Alternatively, colored lamps may also be used.

Within the body 19 is contained an integrated circuit IC, transistor Q1, and two resistors R1 and R2. While the wires interconnecting these component parts of the instrument are not shown in FIG. 2, it is understood that these components are connected in the manner shown in the electrical schematic diagram of FIG. 5.

The probe 20 is connected to the base of transistor Q1 through resistor R1 and to the input of one of the inverter circuits within the integrated circuit. The integrated circuit IC used with this invention is a hex inverter, Model MC834P (manufactured by Motorola Semiconductor Products, Inc., Phoenix, Ariz.), and includes six separate inverter circuits, as shown in FIG. 6, five of which are used in the present invention. Thus, the probe 20 is connected to the input of inverter circuit I1. The output of inverter I1 is connected to the inputs of parallel inverter I2 and I3, and the output of these inverters is connected through lamp L1 to the positive source of power through wire I3.

The collector of transistor Q1 is connected to the positive source of power through wire I3 while the emitter is connected to ground through resistor R2. The junction between the emitter of Q1 and resistor R2 is connected to the inputs of parallel inverter circuits I4 and I5. Since transistor Q1 acts as an emitter-follower, the input impedance to the transistory may be computed by multiplying the beta of the transistor times the value of resistor R2. In the present invention, the transistor Q1 is the type 2N3391 (General Electric) and has a beta of approximately 250, and therefore, with resistor R2 having a value of 510 ohms, the input impedance to this device is approximately 127,500 ohms. The outputs of inverters I4 and I5 are connected to the positive source of power through lamp L2.

Inverters I2 and I3, and inverters I4 and I5 are connected in parallel to provide sufficient current carrying capacity for the lamp L1 and L2, respectively. These lamps, General Electric type 680 miniature lamps, each draw approximately 30 ma., and with the integrated circuit package used in this embodiment, parallel circuits are used to prevent the overloading of a single inverter circuit.

In a typical logic circuit, a binary or logic 1 is represented by a voltage which is usually greater than two volts, and typically in the order of three volts, and a binary or logic 0 is represented by a voltage of less than one volt, typically in the order of 0.25 volt. Furthermore, a circuit exhibiting a logic 1 typically has a high impedance, in the order of 6000 ohms, for example, while the circuit, when exhibiting a logic 0, has a relatively low input impedance, typically less than a few hundred ohms.

The probe 20 is held against a terminal on the circuit board 12, the condition of which is to be determined, and if the input is a logic 1 or true, a positive voltage above the first predetermined magnitude will appear at the probe 20. This will cause current to flow through resistor R1 and gate transistor Q1 onto the conductive state. This will, in turn, cause the emitter to become positive, and therefore the output of the inverters I4 and I5 will go to the 0 state. Since a positive voltage exists on the other side of the lamp L2, this lamp will be energized to indicate the logic 1 or true condition.

If the signal at the probe is a logic 0, that is, where the voltage on the probe 20 is below the second predetermined magnitude, then transistor Q1 will remain in the cutoff state. The input of inverter I1 will be 0 and therefore its output will be positive. Therefore, the output of inverters I1 and I3 will go to 0 and cause current to flow through lamp L1 which lights and indicates a logic 0 in the display screen.

Under those conditions where the probe is floating or where the probe is connected to an infinite resistance, and also in the case where the voltage is between that exhibited by a logic 1 or a logic 0, the input of inverter I1 will be essentially positive and therefore the output of inverters I2 and I3 will also be positive, thus preventing current from flowing through lamp L1. Also, transistor Q1 will remain in the non-conducting state because insufficient current flows through R1, and therefore the output of inverters I4 and I5 will be positive thus preventing current from flowing through lamp L2.

Thus, if the voltage at the probe 20 exceeds a first predetermined magnitude, determined by the characteristics of transistor Q1, which in the preferred embodiment is a silicon device, that transistor will conduct and lamp L2 will light, and if the voltage at the probe is below a second predetermined magnitude, determined by the characteristics of inverter I1, lamp L1 will light to indicate a logic 0. On the other hand, if no current flows through the probe 20, or if the voltage on the probe lies between the first and second predetermined magnitudes, both lamps will remain dark.

When the probe 20 is connected to a source of clock pulses which alternately go between a logic 1 and a logic 0, both lamps will light alternately. Of course, the frequency of the clock pulse, in some cases, can be determined visually by observing the flashing rate of the lamps. In those cases where the clock pulse is of very short duration, it may be that one of the lamps may not receive sufficient average current to be visually illuminated, and therefore, as in the case with most test instruments, it will be necessary that the technician using this probe train himself to recognize the various conditions which he may encounter.

With an input supply voltage ranging from 3.75 volts to 6.5 volts, it has been found that the device described above will indicate a logic 0 if the input voltage is 1.0 volt or less, while a logic 1 will be indicated if the input voltage is 2.0 volts or greater.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for indicating a voltage level within a selected portion of an electrical circuit, comprising an electrically conductive probe adapted to be placed in contact with said selected portion of said circuit;

means electrically connected to said probe for sensing a first condition where the voltage level is above a first predetermined magnitude;

means electrically connected to said probe for sensing a second condition where the voltage is below a second predetermined magnitude lower than said first predetermined magnitude;

both said means for sensing said first condition and said second condition presenting a high impedance to voltages above said first predetermined magnitude, said means for sensing said second condition presenting a low impedance to voltages below said second predetermined magnitude;

means electrically connected to said probe for sensing a third condition where the voltage level is either between said first and second predetermined magnitudes or where the input to the apparatus is not connected to a source of current;

a pair of indicator lamps connected to said sensing means for indicating said conditions, said lamps being selectively energized so that only one of said lamps is energized when either said first or second condition exists and both said lamps obtaining the same condition of energization when said third condition exists; and means for connecting said apparatus to a separate source of power, different from said selected portion of said electrical circuit the voltage of which is to be indicated by said apparatus, said separate source supplying operating power to said sensing means and said indicator lamps.

2. Apparatus for indicating a voltage level within a selected portion of an electrical circuit, comprising an electrically conductive probe adapted to be placed in contact with said selected portion of said circuit;

means electrically connected to said probe for sensing a first condition where the voltage level is above a first predetermined magnitude, said means including an emitter-follower amplifier having the input thereto connected to sense the voltage level, and an inverter circuit (I4) connected to the output of said emitter-follower amplifier;

means electrically connected to said probe for sensing a second condition where the voltage level is below a second predetermined magnitude lower than said first predetermined magnitude;

means electricaly connected to said probe for sensing a third condition where the voltage level is either between said first and second predetermined magnitudes or where the input to the apparatus is not connected to a source of current; and indicator lamps connected to said sensing means for indicating said conditions, one of said indicator lamps being connected to the output of said inverter circuit to indicate when the input to said emitter-follower is above said first predetermined level.

3. Apparatus for indicating a voltage level within a selected portion of an electrical circuit, comprising an electrically conductive probe adapted to be placed in contact with said selected portion of said circuit;

means electrically connected to said probe for sensing a first condition where the voltage level is above a first predetermined magnitude;

means electrically connected to said probe for sensing a second condition where the voltage level is below a second predetermined magnitude lower than said first predetermined magnitude, said means including an inverter circuit (I1) having its input connected to sense the voltage level, and a further inverter circuit (I2) connected to the output of said inverter circuit (I1);

means electrically connected to said probe for sensing a third condition where the voltage level is either between said first and second predetermined magnitudes or where the input to the apparatus is not connected to a source of current; and indicator lamps connected to said sensing means for indicating said conditions, one of said indicator lamps being connected to the output of said further inverter circuit (I2) to indicate when the input to said inverter circuit (I1) is below said second predetermined level.

4. Apparatus for indicating a voltage level within a selected portion of an electrical circuit, comprising an electrically conductive probe adapted to be placed in contact with said selected portion of said circuit;

means electrically connected to said probe for sensing a first condition where the voltage level is above a first predetermined magnitude;

means electrically connected to said probe for sensing a second condition where the voltage level is below a second predetermined magnitude lower than said first predetermined magnitude;

means for sensing a third condition where the voltage level is either between said first and second predetermined magnitudes or where the input to the apparatus is not connected to a source of current, said means including:

an emitter-follower amplifier connected to sense the voltage level, an inverter circuit (I4) connected to the output of said amplifier, said inverter circuit operable only when the voltage level at the input to said amplifier is above said first predetermined level; and another inverter circuit (I1) connected to sense the voltage level, said inverter circuit (I1) being so biased that it requires a voltage level below said second predetermined level to cause operation thereof; and indicator lamps connected to said sensing means for indicating said conditions, said indicator lamps being connected to the outputs of said inverter circuits (I4 and I1), and wherein said third condition is indicated by both indicator lamps being deenergized.

5. A hand held apparatus for indicating the logic condition of a terminal within an electrical circuit as represented by its voltage level, said apparatus including a body member;

an electrically conductive probe at one end of said body member adapted to be placed into contact with a terminal of the component being tested;

a display screen at the other end of said body member;

a pair of lamps within said display screen to indicate the logic condition of the component; and first circuit means within said body member including a high impedance amplifier having its input connected to said probe to sense the voltage level thereon, an inverter circuit (I4) connected to the output of said amplifier, and wherein one of said pair of lamps connected to said inverter circuit (I4) to indicate when the voltage level on said probe is above a first predetermined level;

second circuit means within said body member including an inverter circuit (I1) having its input connected to said probe to sense the voltage level thereon, said inverter circuit being so biased that it requires a voltage level below a second predetermined level lower than said first predetermined magnitude to cause operation thereof, and wherein the other of said pair of lamps connected to the output of said inverter circuit (I1) to indicate when the voltage level on said probe is below said second predetermined level.

6. The apparatus of claim 5 wherein said first and second circuit means prevents energization of either of said lamps when the voltage level on said probe is between either said first and said second predetermined magnitudes, or when no input voltage appears on said probe.

7. Apparatus for indicating a voltage level within a selected portion of an electrical circuit, comprising an electrically conductive probe to be placed in contact with said selected portion of said circuit;

means electrically connected to said probe for sensing a first condition where the voltage level is above a first predetermined magnitude, said means including an emitter-follower amplifier having the input thereto connected to sense the voltage level in said probe, and a first inverter circuit (I4) connected to the output of said emitter-follower amplifier;

means electrically connected to said probe for sensing a second condition where the voltage level is below a second predetermined magnitude lower than said first predetermined magnitude, said means including a second inverter circuit (I1) having its input connected to sense the voltage level on said probe;

means electrically connected to said probe for sensing a third condition where the voltage level is either between said first and second predetermined magnitudes or where the input to the apparatus is not connected to a source of current, said means including said emitter-follower amplifier connected to sense the voltage level on said probe, and said first inverter circuit (I4), said first inverter circuit operable only when the voltage level at the input to said amplifier is above said first predetermined level, and said second inverter circuit (I1) connected to sense the voltage level on said probe, said second inverter circuit (I1) being so biased that it requires a voltage level below said second predetermined level to cause operation thereof; and indicator lamps connected to said sensing means for indicating said conditions, a first indicator lamp connected to the output of said first inverter circuit to indicate when the input to said emiter-follower is above said first predetermined level, and an indicator lamp connected to the output of said second inverter circuit (I1) to indicate when the input to said second inverter circuit is below said second predetermined level, and wherein said third condition is indicated by both indicator lamps being deenergized.

8. The apparatus of claim 7 further including a third inverter circuit (I2) connected between the output of said second inverter circuit (I1) and said second indicator lamp, and wherein each of said indicator lamps is connected to a source of power.

References Cited

UNITED STATES PATENTS

| | | | |
|---|---|---|---|
| 2,689,939 | 9/1954 | Godshalk | 324—29.5 |
| 2,942,189 | 6/1960 | Shea | 324—133 |
| 2,991,413 | 7/1961 | Taylor | 340—249 XR |
| 2,993,172 | 7/1961 | Karlicek | 324—133 |
| 3,072,895 | 1/1963 | Kaufman | 324—133 XR |
| 3,157,870 | 11/1964 | Marino et al. | 340—249 |
| 3,231,816 | 1/1966 | Oehlerking. | |
| 3,281,692 | 10/1966 | Beroset | 324—133 XR |
| 3,311,907 | 3/1967 | Teal | 340—248 |
| 3,328,684 | 6/1967 | Dorris | 324—51 |
| 3,258,758 | 6/1966 | Byrd. | |
| 3,321,754 | 5/1967 | Grimm et al. | 340—249 |

GERARD R. STRECKER, Primary Examiner

U.S. Cl. X.R.

324—72.5; 340—248